Oct. 31, 1939.  G. L. SCHUYLER ET AL  2,177,673
BOMB DISPLACING GEAR
Filed Dec. 10, 1931  2 Sheets-Sheet 1
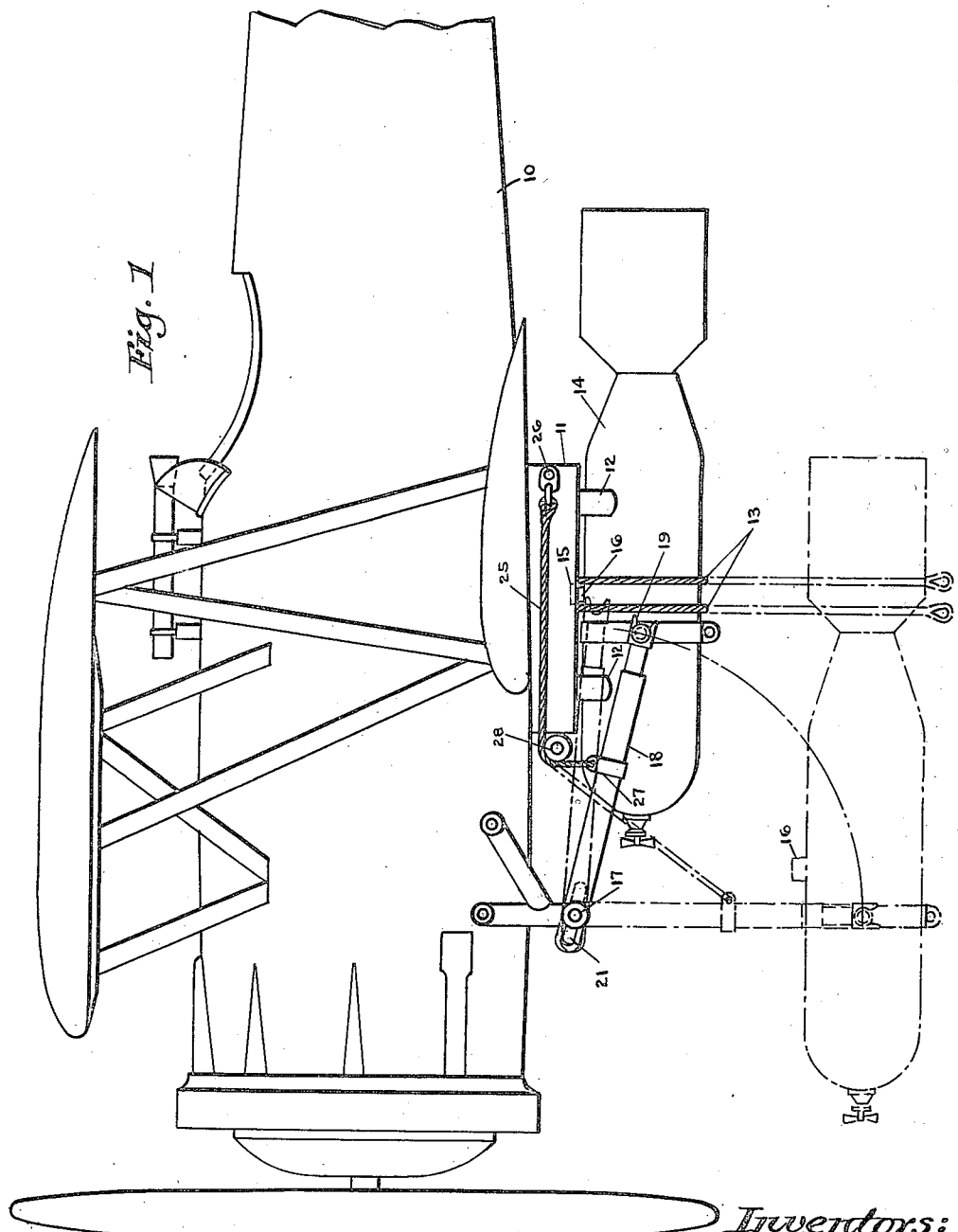
Inventors:
Garret L. Schuyler
Arthur C. Mites
George A. Chadwick
By Robert A. Lavender
Attorney

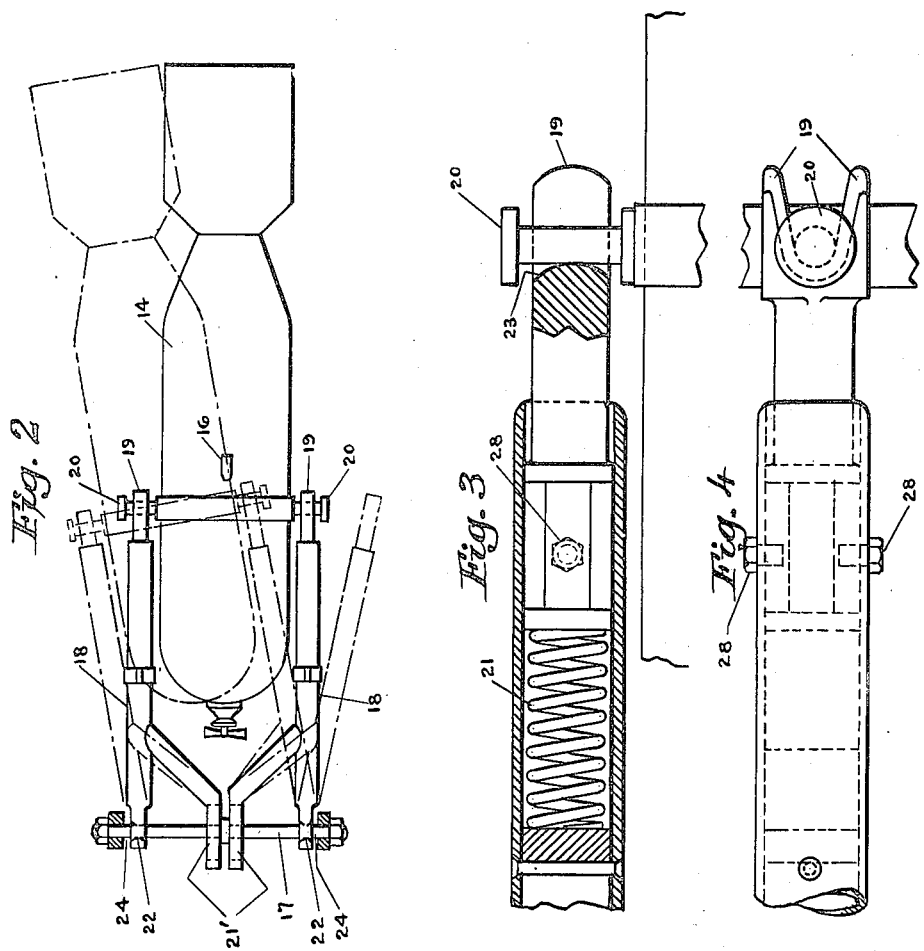

Patented Oct. 31, 1939

2,177,673

UNITED STATES PATENT OFFICE 2,177,673

BOMB DISPLACING GEAR

Garret L. Schuyler and Arthur C. Miles, United States Navy, and George A. Chadwick, Washington Grove, Md.

Application December 10, 1931, Serial No. 580,186

10 Claims. (Cl. 89—1.5)

(Granted under the act of March 3, 1883, as amended April 30, 1928; 370 O. G. 757)

This invention relates to a bomb displacing gear for use with aircraft and more particularly to a device adapted to assure that the final release of a bomb will take place at a position more removed from the airplane than the bomb rack in which said bomb is carried.

An object of this invention is to displace the bomb sufficiently far from the airplane during launching to be sure that it will not strike the propellers of the airplane during the beginning of its flight, this displacing to cause a minimum disturbance to the normal flight of the bomb.

Another object of this invention is to provide an automatic retrieving device which will house the displacing mechanism close to the airplane after the bomb has been completely released, so as to avoid interference with flight or the landing of the airplane.

With the above and other objects in view, this invention consists in the construction, combination and arrangement of parts as will be described more fully hereinafter.

In releasing a bomb from an airplane executing a steep dive, the released bomb, which after release travels faster than the airplane, is liable to strike the propeller or become lodged in the landing gear or other parts of the airplane resulting in a premature explosion and loss of life and the airplane. This invention prevents such an occurrence.

Our invention can best be understood by reference to the accompanying drawings, in which:

Fig. 1 shows a bomb secured in a bomb rack on an airplane and also in the final releasing position;

Fig. 2 shows the freedom of lateral movement of the bomb relative to the airplane as allowed by the displacing mechanism;

Fig. 3 is a section of one fork of the displacing mechanism showing the spring that maintains the fork snugly against the carrying lug on the bomb;

Fig. 4 is a side vew showing a fork of the displacing mechanism in position on the carrying lug on the bomb.

Similar numerals refer to similar parts throughout the several views.

In Fig. 1, airplane 10 is provided with a bomb rack 11 which has two chocks or braces 12 and slings 13 for holding the bomb in position for releasing. A socket 15, into which fits lug 16, prevents any longitudinal motion of the bomb prior to releasing.

A shaft 17 secured to the airplane structure serves as a support for two braced guide frames or displacing members 18. The unsupported end of each displacing member terminates in a fork 19 which engages a carrying lug 20 on each side of the bomb near its center of gravity. Each fork is swivelled and is backed by a spring 21' permitting each fork to be held snugly against its corresponding carrying lug while the bomb is secured in the rack and during the launching until the bomb has fallen safely clear of the airplane structure. The stop bolts 28 permit longitudinal and rotary motion of the forks.

The two guide frames are not tied together but are capable of revolving separately around shaft 17. The slots 21, rounded bearing surfaces 22 and 23 and extra lengths 24 of shaft 17 permit of easy but limited lateral motion of the bomb relative to the plane during launching. In this manner, even though the airplane changes its rectilinear course during launching and before the bomb has fallen clear, the smooth flight of the bomb will suffer the least possible disturbance. The above, together with the swivelling of the forks, permits the maximum amount of lateral freedom of the bomb consistent with safety. This lateral motion is illustrated by the dotted position of the bomb and guide frames in Fig. 2.

The retrieving mechanism consists of rubber cords 25 secured to the bomb rack at 26, passing over pulleys 28 and secured to lugs 27 on the guide frame members.

The operation of the entire mechanism is as follows: The bomb is placed in the rack with the forks of the displacing members engaging the carrying lugs on the bomb. When the bomb is released by the releasing mechanism of the bomb rack, the weight of the falling bomb will pull down the displacing members with a pivoted movement about shaft 17, thereby holding the bomb clear of the airplane structure. The forks are shaped to remain engaged with the carrying lugs until the bomb has moved to a safe dropping position at which point the carrying lugs slide of the forks. This is shown by the dotted position of the bomb in Fig. 1.

After the carrying lugs of the bomb have fallen clear of the forks of the displacing members, the rubber cords 25, which are of proper length and elasticity, carry the displacing members to the housed position shown by the dotted lines in Fig. 1 and hold them there. During this operation the displacing members also have the wind resistance forcing them to the rear, and a suitable means (not shown) is provided to absorb the shock, resulting from energy from both sources, when the displacing members reach the housed position.

It will be understood that the above description and accompanying drawings comprehend only the general and preferred embodiment of our invention, and that various changes in construction, proportion and arrangement of parts may be made within the scope of the appended claims without sacrificing any of the advantages of our invention.

The invention described herein may be manufactured by or for the Government of the United States of America for governmental purposes without the payment of any royalties thereon or therefor.

We claim:

1. An aircraft bomb displacing device comprising a shaft secured to the airplane structure, two displacing members each separately revolvable on said shaft, said displacing members each having a limited lateral motion with respect to the airplane, a spring-backed swivelled forked member mounted at the end of each displacing member, said forks being adapted to engage lugs fitted on the bomb, and elastic cords fixed to each displacing member, the other ends of said cords being fixed to either the bomb rack or airplane structure.

2. In an aircraft bomb displacing device, a Y-shaped displacing member, said member having a rounded bearing surface in one of the short legs, a closed slot in the other short leg, and a swivelled forked member with a rounded bearing surface fitted in the long leg, said forked member having a limited longitudinal motion in which the inward stroke is spring cushioned.

3. In an aircraft bomb displacing device, a displacing member, said member having a rounded bearing surface at one end, a swivelled forked member with a rounded bearing surface at the other end, said forked member having a limited inwardly spring cushioned longitudinal motion, and an arm disposed at an angle to said member and provided with a closed slot near its remote end.

4. In an aircraft bomb displacing device, a displacing member having one end adapted to be revolvably mounted on a shaft, a swivelled forked member mounted at the other end of said displacing member and having a limited longitudinal motion, the inward movement being spring cushioned, and an arm extending at an angle from said displacing member and provided with a closed slot near its remote end.

5. An aircraft bomb displacing device comprising a shaft secured in fixed relation to the airplane, two displacing members each having one end pivoted to said shaft, said displacing members having limited lateral movement with respect to the airplane, and a spring-backed swivelled forked member fitted in the other end of each displacing member, said forks being adapted to engage lugs fitted on the bomb.

6. An aircraft bomb displacing device comprising a shaft secured in fixed relation to the airplane, two displacing members each having one end pivoted to said shaft, said displacing members having limited lateral movement with respect to the airplane, a spring-backed swivelled forked member fitted in the other end of each displacing member, said forks being adapted to engage lugs fitted on the bomb, and elastic cords, each having one end fixed to a displacing member, the other ends of said cords being secured in fixed relation to the airplane structure.

7. In combination with the body of an aircraft having a propeller, a pair of arms mounted on said body to be swingable in the fore-and-aft direction of the craft when launching a bomb and of a length such that when swung to a position substantially at right angles to the craft, the free ends of said arms are at a distance from the axis of rotation of the propeller greater than the radius of said propeller by a length approximating the radius of the bomb to be dropped, said free ends being forked, a member having aligned, oppositely extending lugs receivable in said forked ends, said member being engageable with the body of the bomb with the longitudinal axes of the lugs lying on a transverse line through the center of gravity of the bomb, and resilient means to rotate said arms backwardly to a position substantially parallel to the body of the craft after the bomb is dropped.

8. In combination with the body of an aircraft having a propeller, a pair of arms mounted on said body to be swingeable in the fore-and-aft direction of the craft when launching a bomb and of a length such that when swung to a position substantially at right angles to the craft, the free ends of said arms are at a distance from the axis of rotation of the propeller greater than the radius of said propeller by a length approximating the radius of the bomb to be dropped, said free ends being forked, a member having aligned, oppositely extending lugs receivable in said forked ends, said member being engageable with the body of the bomb with the longitudinal axes of the lugs lying on a transverse line through the center of gravity of the bomb, and means automatically to return said arms to a position substantially parallel to the body of the craft after the bomb is dropped.

9. In combination with the body of an aircraft having a propeller, a pair of arms mounted on said body to be swingable in the fore-and-aft direction of the craft when launching a bomb and of a length such that when swung to a position substantially at right angles to the craft the free ends of the arms are at a distance from the axis of rotation of said propeller greater than the radius of the propeller by a length approximating the radius of the bomb to be dropped, said free ends being forked, a member having aligned, oppositely extending lugs receivable in said forked ends and retained therein by gravity only from the initiation of the launching movement until said arms have substantially reached said right angle position, said member being engageable with the body of the bomb with the longitudinal axes of the lugs lying on a transverse line through the center of gravity of the bomb, and means automatically to return said arms to a position substantially parallel to the body of the craft after the bomb is dropped.

10. Bombing gear, comprising means mountable on the lower surface of an aircraft and adapted to carry a bomb with its longitudinal axis substantially parallel to the axis of the aircraft, said means including releasable elements to free the bomb, a pair of oppositely disposed trunnions with a common axis passing through the center of gravity of the bomb, a pair of arms each mounted at one end for pivotal and limited sliding movement and having at their other ends bifurcations adapted to seat on said trunnions, the trunnions being held in the bifurcations solely by the weight of the bomb until said arms have swung to a position substantially at right angles to said axis of the aircraft when the said elements are released during a dive of the craft.

GARRET L. SCHUYLER.
ARTHUR C. MILES.
GEORGE A. CHADWICK.